(12) United States Patent
Ward, Jr. et al.

(10) Patent No.: US 11,254,058 B2
(45) Date of Patent: Feb. 22, 2022

(54) ADJUSTABLE CARRIAGE AND OPTIMIZED BEARING SURFACE MEANS

(71) Applicants: Robert E. Ward, Jr., Grand Rapids, MN (US); Richard M. Davidian, Pickens, SC (US)

(72) Inventors: Robert E. Ward, Jr., Grand Rapids, MN (US); Richard M. Davidian, Pickens, SC (US)

( * ) Notice: Subject to any disclaimer, the term of this patent is extended or adjusted under 35 U.S.C. 154(b) by 880 days.

(21) Appl. No.: 15/711,243

(22) Filed: Sep. 21, 2017

(65) Prior Publication Data

US 2019/0084240 A1  Mar. 21, 2019

(51) Int. Cl.

| | |
|---|---|
| *B29C 64/393* | (2017.01) |
| *B29C 64/209* | (2017.01) |
| *B33Y 30/00* | (2015.01) |
| *B29C 64/227* | (2017.01) |
| *B23Q 7/00* | (2006.01) |
| *B23Q 7/08* | (2006.01) |
| *B23Q 5/22* | (2006.01) |
| *B29C 64/25* | (2017.01) |
| *B33Y 70/00* | (2020.01) |
| *B29C 64/245* | (2017.01) |

(52) U.S. Cl.
CPC .............. *B29C 64/393* (2017.08); *B23Q 5/22* (2013.01); *B23Q 7/005* (2013.01); *B23Q 7/08* (2013.01); *B29C 64/209* (2017.08); *B29C 64/227* (2017.08); *B29C 64/25* (2017.08); *B33Y 30/00* (2014.12); *B33Y 70/00* (2014.12); *B29C 64/245* (2017.08)

(58) Field of Classification Search
CPC ..... B29C 64/25; B29C 64/227; B29C 64/232; B29C 64/236; B29C 64/245; B29C 64/20; B33Y 30/00; B23Q 3/18; B23Q 5/22; B23Q 7/005; B23Q 7/05
See application file for complete search history.

(56) References Cited

U.S. PATENT DOCUMENTS

| | | | |
|---|---|---|---|
| 2015/0147424 A1* | 5/2015 | Bibas ...................... | B33Y 50/02 425/150 |
| 2016/0144564 A1* | 5/2016 | Padgett ................. | B29C 64/232 425/113 |

* cited by examiner

*Primary Examiner* — Philip C Tucker
*Assistant Examiner* — Jimmy R Smith, Jr.
(74) *Attorney, Agent, or Firm* — Jeffrey N. Cutler

(57) ABSTRACT

A three-dimensional printer with improved adjustment mechanisms for calibrating the orientation of the build platform and an extrusion assembly to optimize the accuracy of models deposited on the build platform. The printer includes a frame carrying an extrusion assembly proximate the top, and a carriage within. A build platform is mounted on the top of the carriage. Carriage adjustment mechanisms are provided at at least two corners of the carriage for calibrating the orientation of the build platform with respect to the X-Y plane. An extrusion assembly adjustment mechanism is provided at at least one end of the extrusion mechanism for calibrating the orientation of the extrusion mechanism with respect to the Y-axis. A height adjustment mechanism is provided for translating the carriage within the frame along the Z-axis.

14 Claims, 14 Drawing Sheets

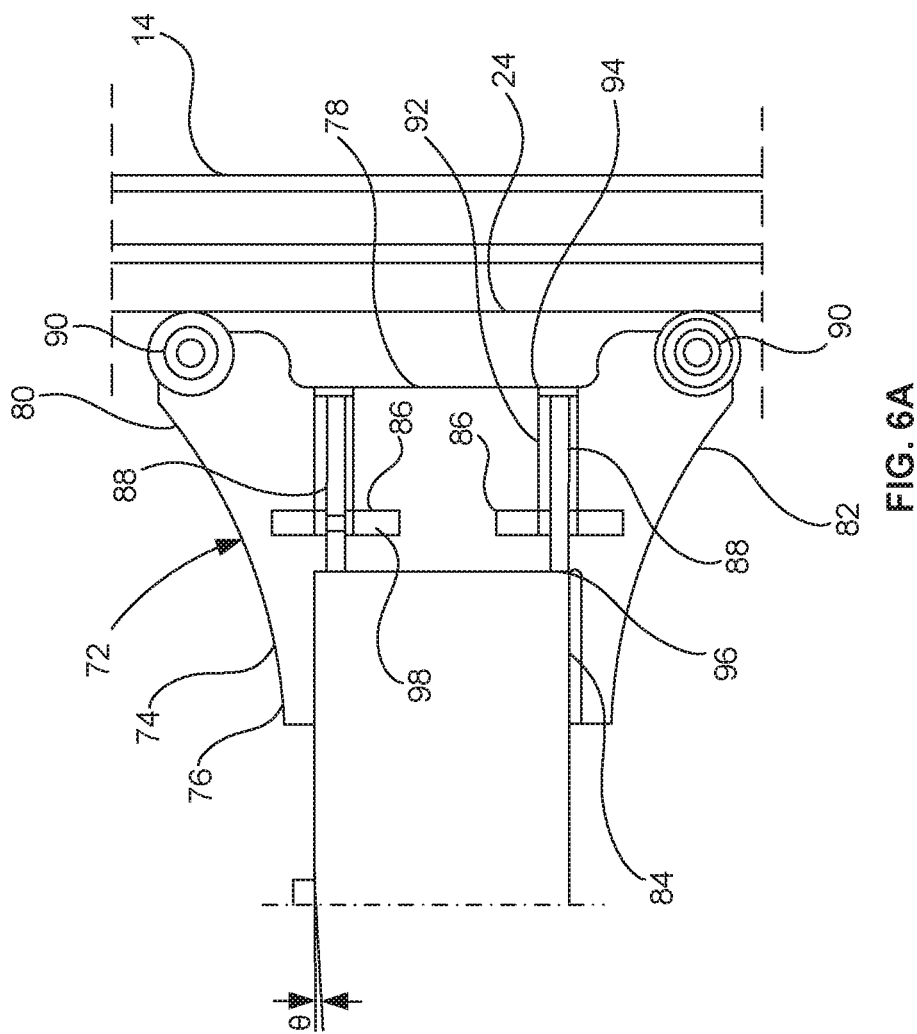

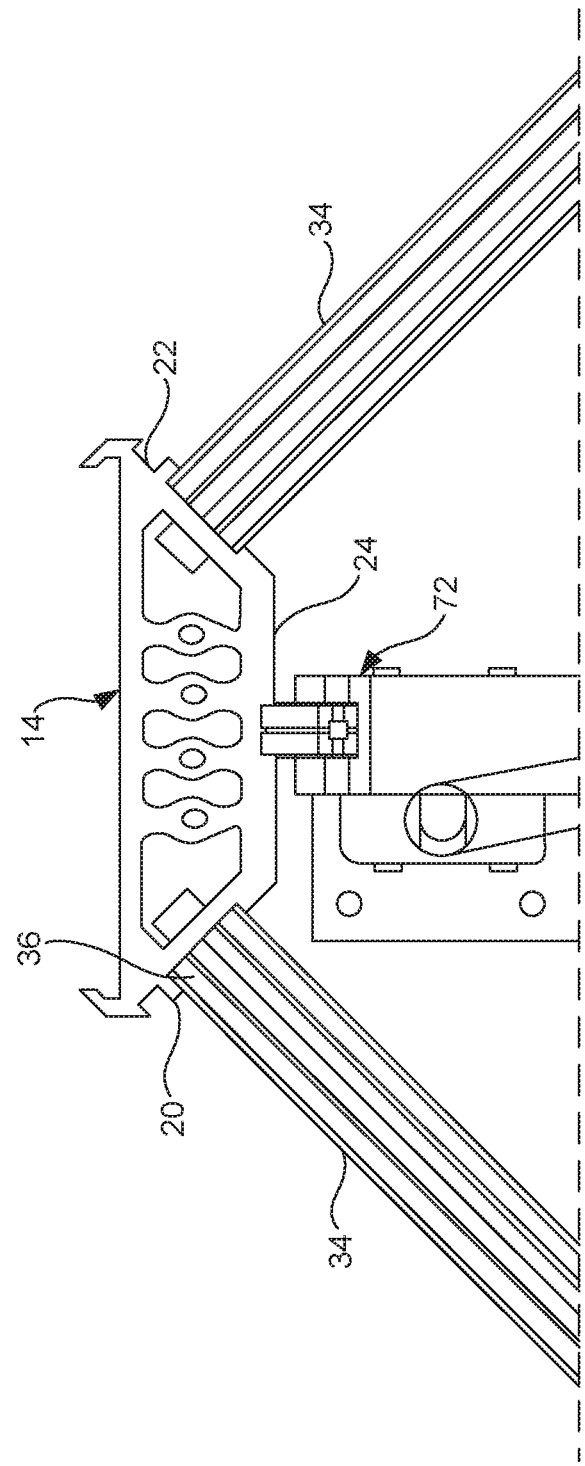

ADJUSTABLE CARRIAGE AND OPTIMIZED BEARING SURFACE MEANS

RELATED APPLICATIONS

This application claims the benefit of Provisional Patent Application No. 62/397,903, entitled "Adjustable Carriage and Optimized Bearing Surface Means", filed on Sep. 21, 2016, the contents of which are incorporated herein by reference.

FIELD OF THE DISCLOSURE

The present invention relates to the field of devices used to accomplish linear motion in a variety of machines used for three-dimensional (3D) applications including, but not limited to, 3D Printing and general machining.

BACKGROUND

Currently, there exist various carriages that ride on linear rails to achieve motion in various axes of movement. These axes are commonly known as X, Y, and Z. Current devices may use ball bearing wheels or polymer bearings as a medium to reduce friction and are driven by a series of motors and belts or lead screws to produce the necessary linear motion. Commonly, these mechanical systems use carriages which are set up to hold extruded or machined rails and these rails are attached by carriages which house ball bearing rollers to effect smooth movement. These carriages can be constructed from a variety of means, and inevitably secure cross-member rails to move in alignment in X, Y, or Z. Inevitably, these carriages can be difficult to adjust and normally, very precise placement of the rails and bearings is required, with great precision during manufacture to maintain an orientation which is perfectly square to the relative frame in which the machine is constructed.

Accordingly, there is a need for a compact, inexpensive carriage and related system whose function is to achieve adjustability evenly and square to the corresponding rails which the carriages are riding upon.

SUMMARY OF THE INVENTION

Therefore, this invention to provides users with a solution to easily adjust carriages which ride in a linear fashion on parallel rails to affect a true perpendicular motion.

This invention provides a method to adjust the perpendicularity of associated rails without using specialized tools.

This invention also provides a means to achieve true linear traveling relationships for machines using single or multiple axis linear systems.

This invention utilizes guide rails which are optimized for proper bearing surface and orientation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 6A and 6B illustrate the adjustment mechanism of FIGS. 4 and 5 in cross-section, showing the build platform support structure out of level and after calibration, respectively;

FIG. 13 is an enlarged top plan view of a corner rail of the frame, showing two top rails secured thereto, and a build platform adjustment mechanism engaged therewith.

Figure 1:
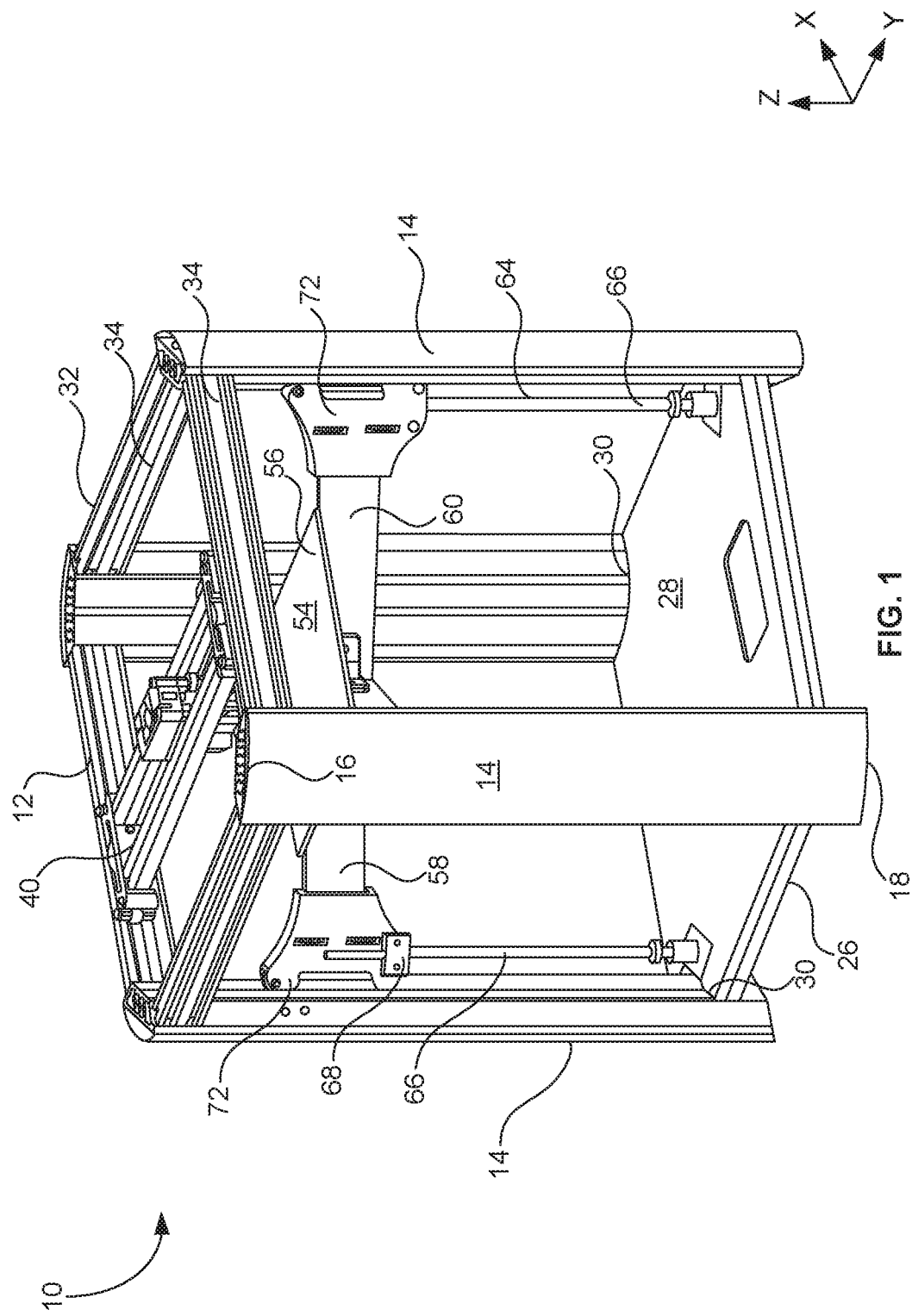
FIG. 1 illustrates a perspective view of a 3-D printer which incorporates the adjustable carriage and optimized bearing surface of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present invention is an improved adjustable carriage for use in applications in which a working head is movable in at least two directions, namely laterally along each of the X-, and Y-axes such that the working head is moveable along the X-Y plane. The adjustable carriage is mounted with a frame such that it is moveable at least laterally in along the Z-axis. The present invention further includes at least one adjustment mechanism for calibrating the orientation of a working surface carried or defined by the adjustable carriage is disposed in a plane substantially parallel to the X-Y plane.

Referring now to the drawings, FIG. 1 is a perspective view of a 3-D printer 10 incorporating adjustable carriage and optimized bearing surface of the present invention. The 3-D printer 10 includes a frame 12 consisting of four stationary corner rails 14 disposed in a vertical orientation and disposed at the four corners of the frame 12. A bottom structure 26 is provided to secure the lower end 18 of each corner rail 14 relative to each other. In the illustrated embodiment, the bottom structure 26 is a rectangular panel 28 defining four corners 30, each configured to engage and be secured to the lower end 18 of one of the corner rails 14 in a conventional manner. Similarly, a top structure 32 is provided to secure the upper end 16 of each corner rail 14 relative to each other. In the illustrated embodiment, the top structure 32 includes four top rails 34, each defining a first end 36 configured to engage and be secured to the upper end 16 of one corner rail 14 in a conventional manner and a second end 38 configured to engage and be secured to the upper end 16 of an adjacent corner rail 14 in a conventional manner. Thus, when the bottom structure 26 is secured to the lower end 18 of each corner rail 14, and the top structure 32 is secured to the upper end 16 of each corner rail 14, the various components of the frame 12 are substantially stationary relative to each other.

The working head of the 3-D printer 10 includes an extruder assembly 40 and the working surface is a build platform 52, each carried by the frame 12. The extruder assembly 40 is configured to move an extruder 46 in each of the X- and Y-axes along an X-Y plane. The extruder assembly 40 includes an extruder 46 provided for depositing a selected material onto the build platform 52 to form a selected three-dimensional model. In the illustrated embodiment, the extruder assembly 40 defines first and second ends 42,44 and is carried by opposing top rails 34, with the first and second ends 42,44 being translatable along the top rails 34 in order to affect translation of the extruder 46 along the X-axis. The extruder assembly 40 is further configured to allow translation of the extruder 46 along the longitudinal axis of the extruder assembly 40, which correlates with the Y-axis of the 3-D printer 10.

In the illustrated embodiment, the build platform 52 is translated along the Z-axis to provide the third dimension to the deposition process. In order for the deposition to remain undistorted, it is imperative that the build platform 52 define a deposition surface parallel to the X-Y plane in which the extruder 46 is translated. Electronics (not illustrated) are also provided and are in communication with the extruder assembly 40, build platform 52, and a computing device (not illustrated) for controlling the operation of the extruder 46, the extruder assembly 40, and the build platform 52 during a material deposition process.

In the illustrated embodiment, the build platform 52 includes a plate 54 supported by a substantially X-shaped support structure 58. The support structure 58 is disposed below the plate 54 and includes four arms 60 extending from a center of the plate 54 toward the four corner rails 14 of the frame 12.

A height adjustment mechanism 64 is provided for translating the build platform 52 along the Z-axis. The height adjustment mechanism 64 includes at least one threaded rod member 66 disposed parallel to the Z-axis, and at least one threaded member 68 configured to rotatably engage the threaded rod 66, the threaded member 68 being disposed on the build platform support structure 58. In the illustrated embodiment, two threaded rod members 66 and cooperating threaded members 68 are provided, with the threaded members 68 being disposed on the distal end 62 of opposing build platform support structure arms 60. As either the threaded rods 66 or the threaded members 68 are rotated, the build platform 52 is translated along the Z-axis.

Figure 2:
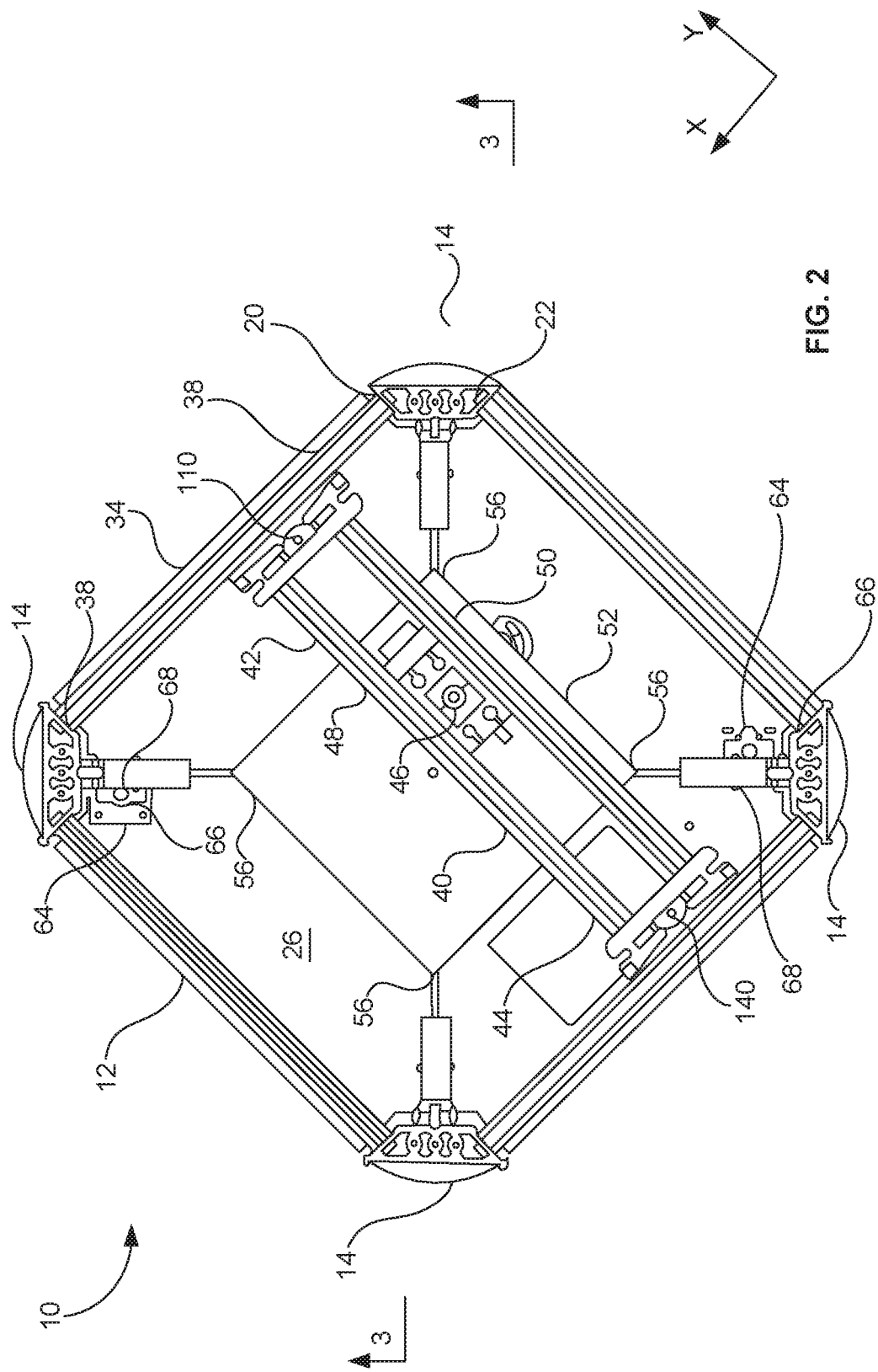
FIG. 2 is a plan view of the 3-D printer illustrated in FIG. 1.

As illustrated in FIG. 2 (and more clearly in FIG. 13), which is a plan view of the 3-D printer 10 illustrated in FIG. 1, each corner rail 14 defines first and second frame mounting surfaces 20,22 that are orthogonally-disposed with respect to one another. The first and second ends 36,38 of the top rails 34 engage and are secured to the first and second frame mounting surfaces 20,22, respectively, such that the top rails 34 collectively define a rectangle. In the illustrated embodiment, the top rails 34 each define the same length, thus they are collectively disposed in a square. Each corner rail 14 further defines a bearing surface 24 disposed between the two frame mounting surfaces 20,22 and at a 45° (forty-five degree) angle with respect to each of the mounting surfaces 20,22.

The build platform 52 is substantially rectangular, defining four corners 30. In the illustrated embodiment, the build platform 52 is substantially square. At least two adjustment mechanisms 72 of the preferred embodiment are disposed on adjacent corners 30 of the build platform 52 and in engagement with the bearing surface 24 of the corresponding frame corner rail 14 in order to accomplish the calibration of the orientation of the build platform 52 with respect to the X-Y plane of the extruder assembly 40. In the illustrated embodiment, four adjustment mechanisms 72 are provided, with one being disposed at the distal end 62 of each arm 60 extending from the support structure 58, and each engaging a corresponding corner rail bearing surface 24.

Figure 3:
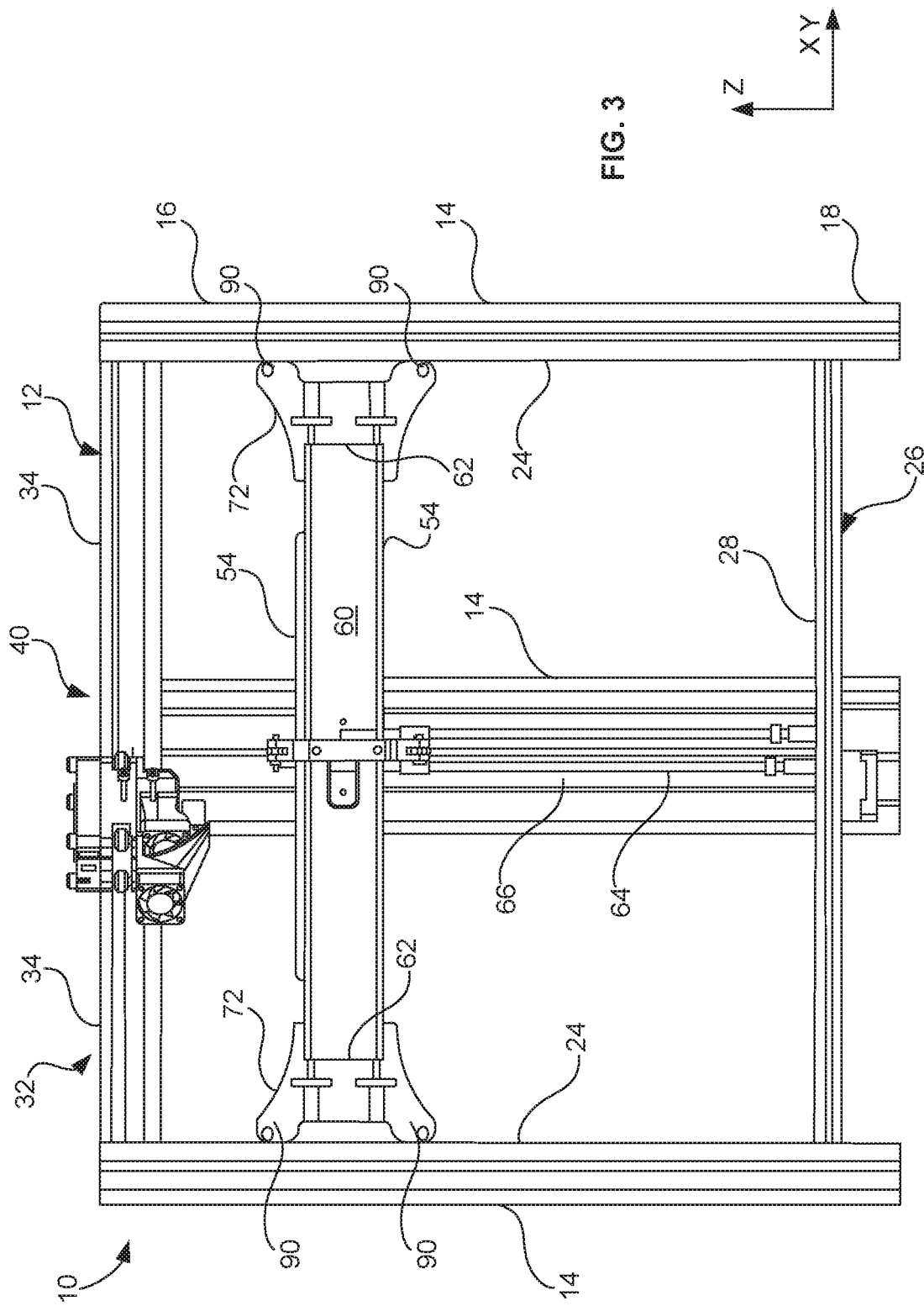
FIG. 3 is a side elevation view of the 3-D printer illustrated in FIG. 2, and taken along section lines 3-3 therein.

FIG. 3 is a side elevation view of the 3-D printer illustrated in FIG. 2, and taken along section lines 3-3 therein. In this view, the relative orientation of the extruder assembly 40—and specifically the X-Y plane in which the extruder 46 is translated—and the build platform 52 is shown. As discussed above, it is imperative during operation of the printer 10 that these be parallel. However, due to manufacturing tolerances of the various components of the printer 10, at least one adjustment mechanism 72 is provided for calibrating the planar orientation of at least one of the extruder assembly 40 and the build platform 52. In the illustrated embodiment, as will be described further below, at least two adjustment mechanisms 72 are provided for adjusting the planar orientation of the build platform 52. Each adjustment mechanism 72 is disposed at a corner 56 of the build platform 52 to engage the bearing surface 24 a corresponding corner rail 14 of the frame 12.

Further illustrated in FIG. 3 is a height adjustment mechanism 64 for translating the build platform 52 along the Z-axis. As described above, as either of the threaded rod 66 or the threaded member 68 is rotated, the build platform 52 is raised or lowered along the Z-axis.

Figure 4:
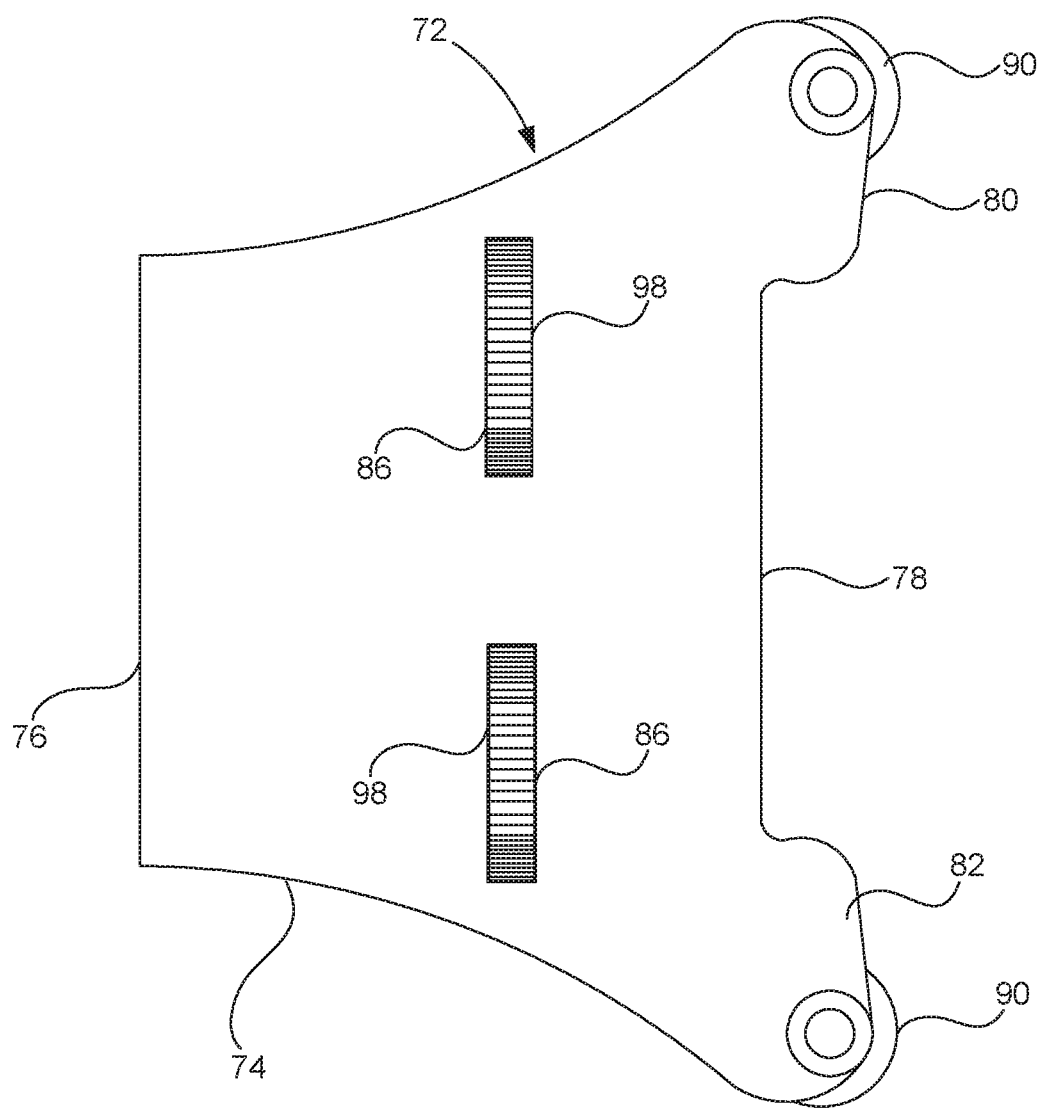
FIGS. 4 and 5 illustrate one embodiment of the adjustment mechanism of the present invention provided for calibrating the level of the build platform relative to the X-Y plane.
Figure 5:
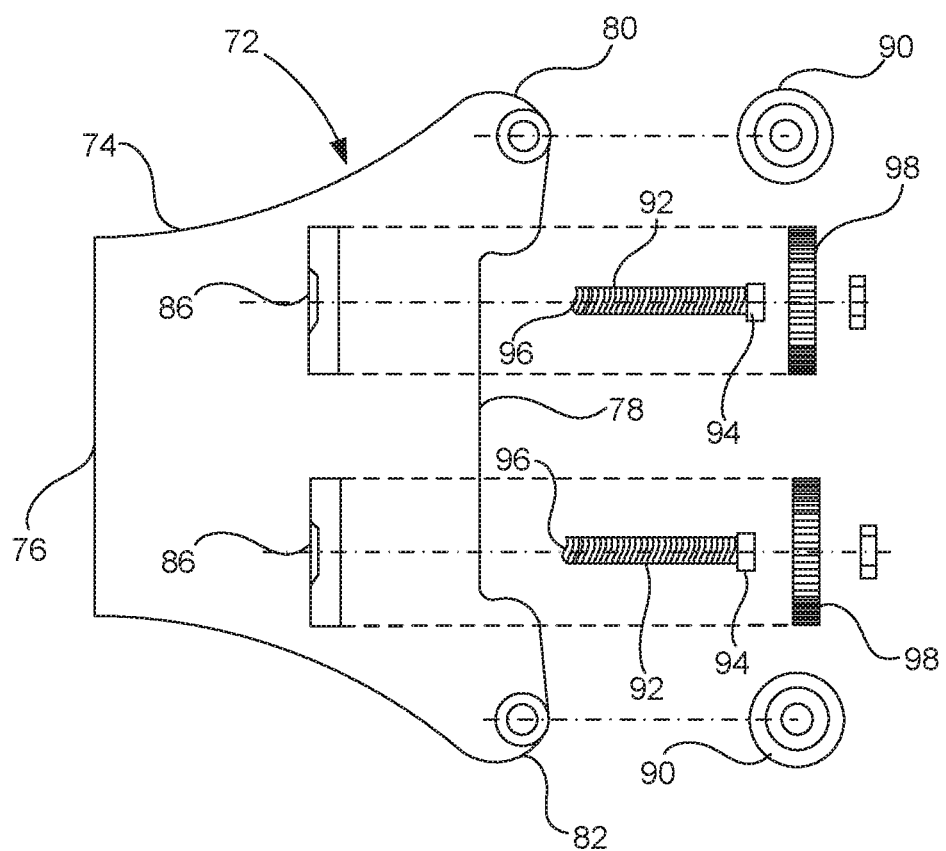

FIGS. 4 and 5 illustrate one embodiment of the adjustment mechanism 72 of the present invention. FIG. 4 illustrates a side elevation of the adjustment mechanism 72 in its assembled form, while FIG. 5 illustrates the same adjustment mechanism 72 in an exploded view. The adjustment mechanism 72 includes at least one bearing wheel 90 provided and positioned to engage the corresponding corner rail bearing surface 24. In the illustrated embodiment, two bearing wheels 90 are provided. Each bearing wheel 90 is provided with an adjuster to move the wheel 90 along the longitudinal axis of the corresponding build platform support structure arm 60, and more specifically, toward and away from the corresponding corner rail bearing surface 24. Accordingly, in the illustrated embodiment, two adjusters are provided. Each adjuster includes a threaded screw 92 carried by the adjustment mechanism 72.

Figure 6B:
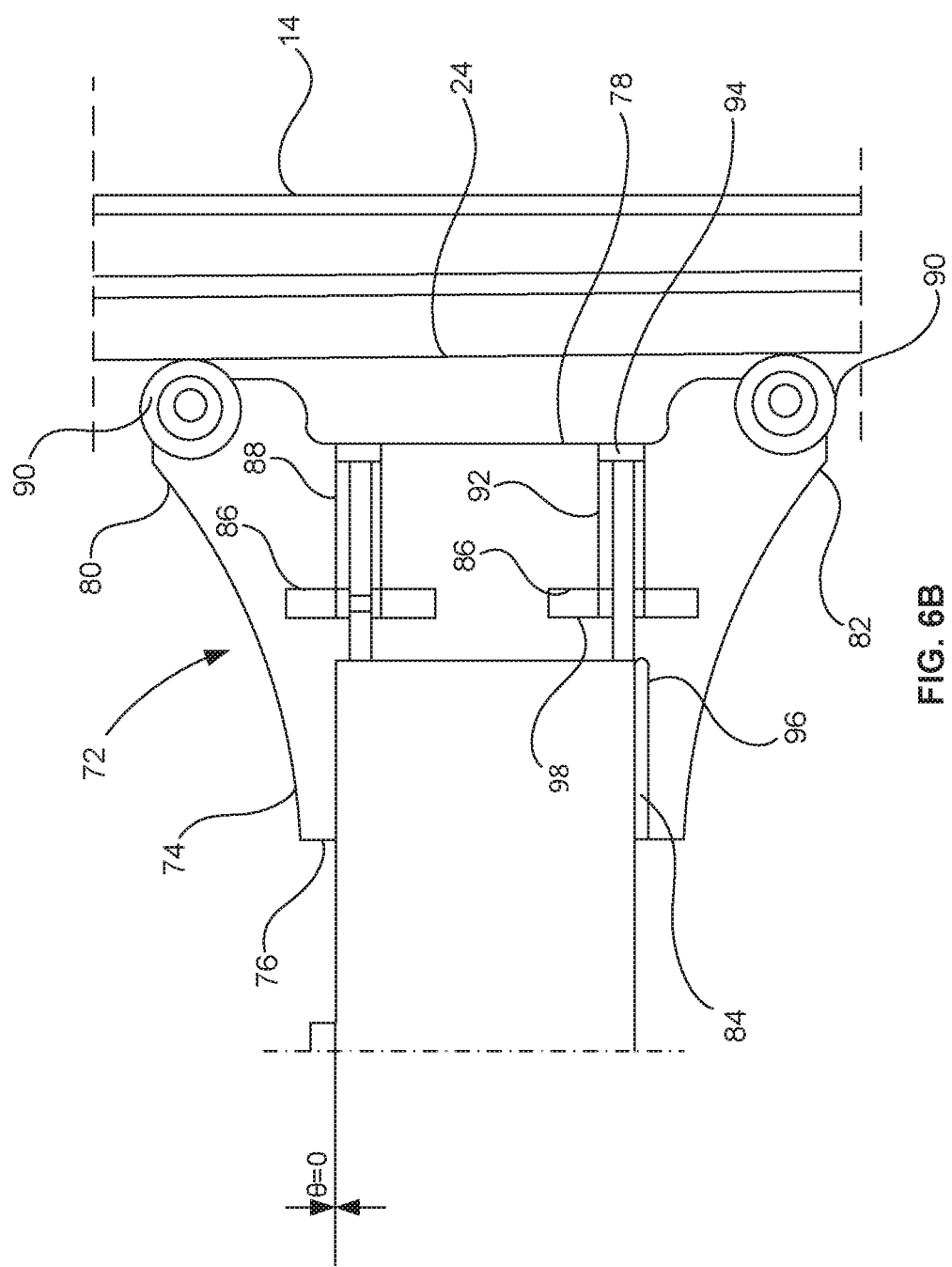

FIGS. 6A and 6B illustrate the adjustment mechanism 72 of FIGS. 4 and 5 in cross-section. In the illustrated embodiment, the adjustment mechanism 72 includes a housing 74 defining first and second ends 76,78. A receptacle 84 disposed at the first end 76 is configured to loosely receive the distal end 62 of one of the build platform support structure arms 60. Two bearing wheels 90 are rotatably carried at the upper and lower corners 80,82 of the second end 78. Two threaded screws 92 are disposed within through openings 88 defined by the housing 74, with the distal end 96 of each being extendable into the receptacle 84 in order to engage the distal end 62 of the build platform support structure arm 60. The through openings 88 are configured to closely receive the head 94 of each screw 92 such that the screws 92 are limited to linear movement with the through openings 88, and more specifically, prevented from rotation within the through openings 88. A slotted opening 86 is defined on either side of the housing 74 and in cooperation with each through opening 88 and is dimensioned to receive an adjustment wheel 98. The adjustment wheel 98 is configured to cooperatively receive a threaded screw 92. Thus, when assembled, the adjustment wheel 98 is rotated to either translate the associated threaded screw 92 toward or away from the receptacle 84.

In the illustration of FIG. 6A, the build platform support structure arm 60 is shown to be disposed at an angle θ with respect to the X-Y plane. It is desired to calibrate the orientation of the build platform 52 in order to reduce angle θ to 0° (zero degrees). To accomplish this in the illustrated embodiment, the upper adjustment wheel 98 is engaged to translate its threaded screw 92 away from the support structure arm 60 (to the right in the illustration), and the lower adjustment wheel 98 is engaged in the opposite direction to translate its threaded screw 92 toward the support structure arm 60 (to the left in the illustration). In so doing, the build platform 52 is re-oriented as illustrated in FIG. 6B.

Figure 7:
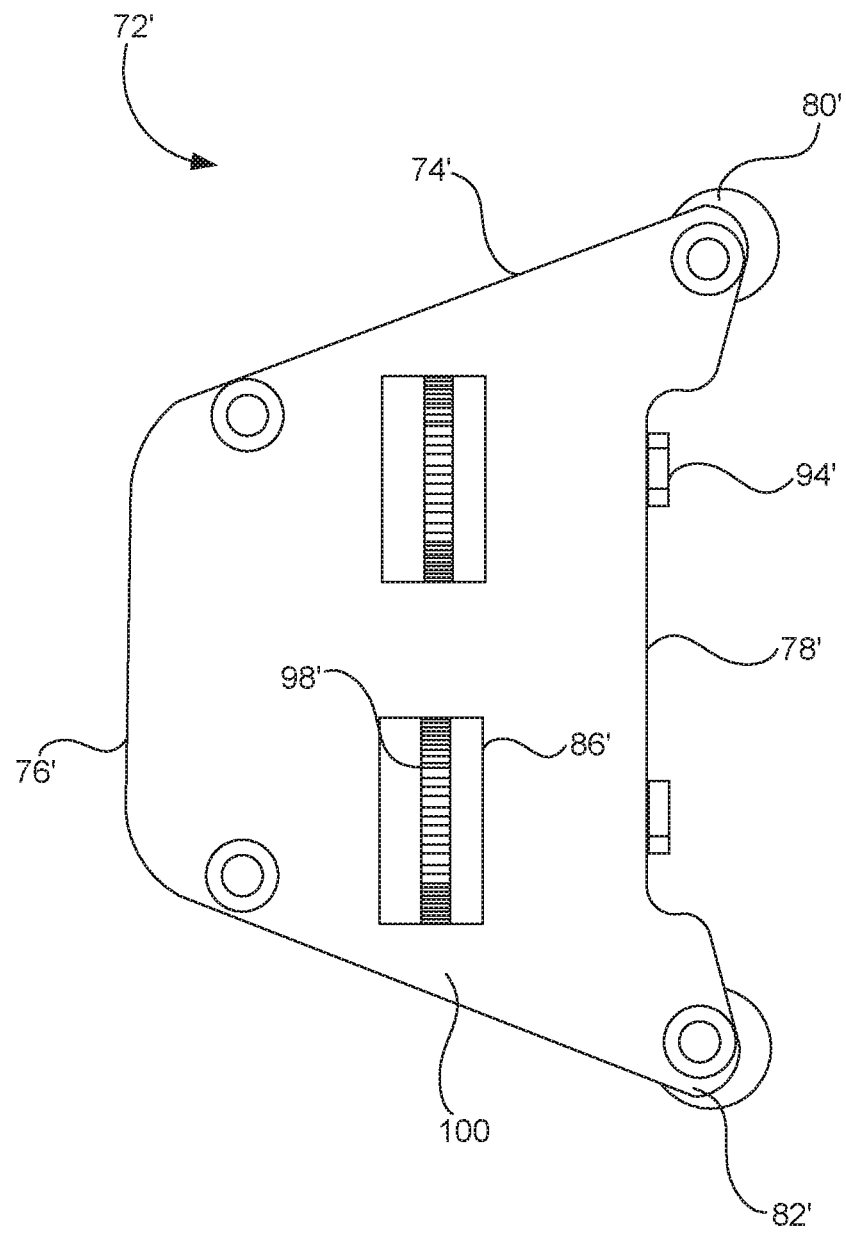
FIGS. 7 and 8 illustrate an alternate embodiment of the adjustment mechanism of the present invention.
Figure 8:
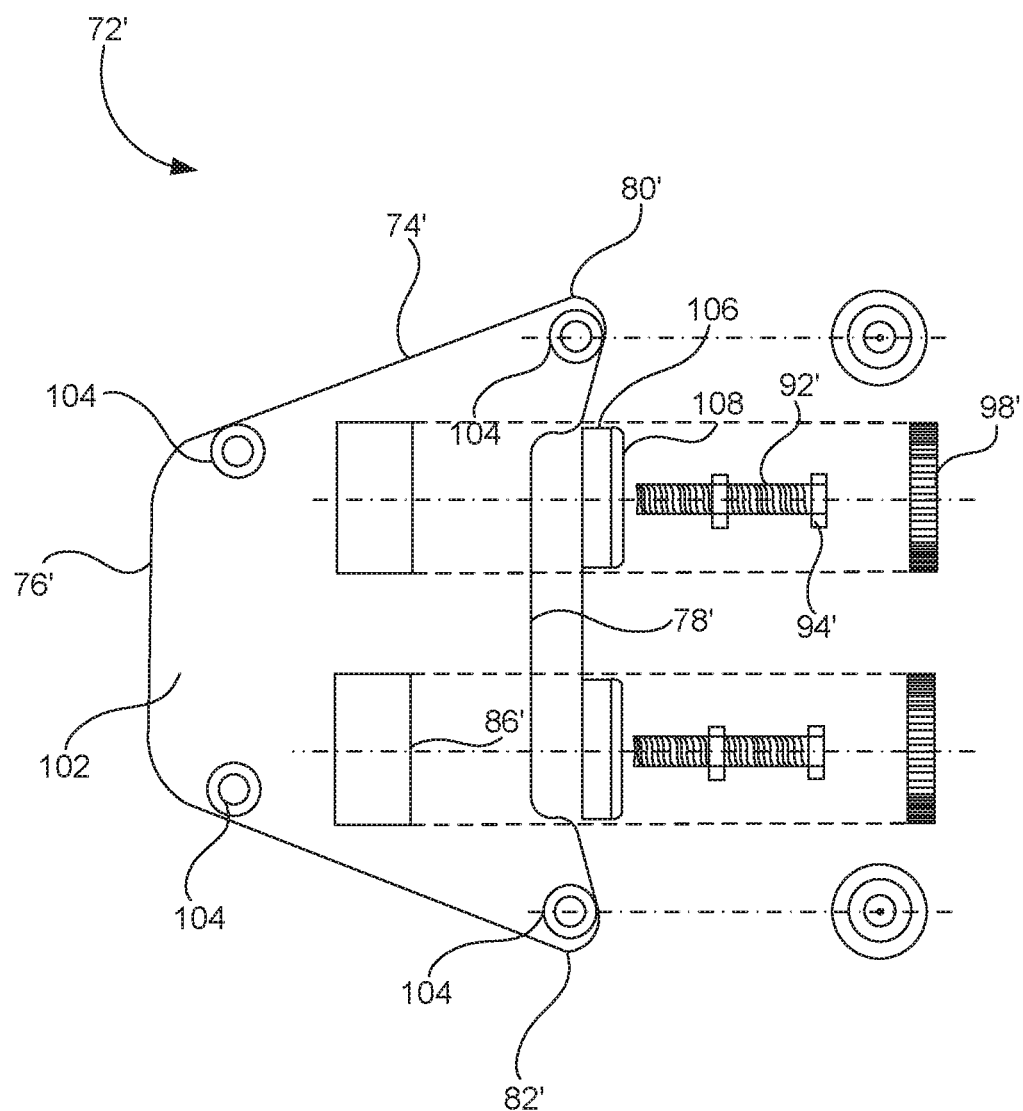

FIGS. 7 and 8 illustrate an alternate embodiment of the adjustment mechanism 72' of the present invention. In this embodiment, the housing 74' includes front and rear sides 100,102 secured to each other via a plurality of spacers 104. A receptacle 84' is defined between the front and rear sides 100,102. A carrier 106 is received within the receptacle 84'. The carrier 106 defines two through openings 108 for receiving the threaded screws 92' therethrough. The through openings 108 are configured to closely receive the head 94' of each threaded screw 92' such that rotation of the threaded screw 92 is prevented.

Figure 9:
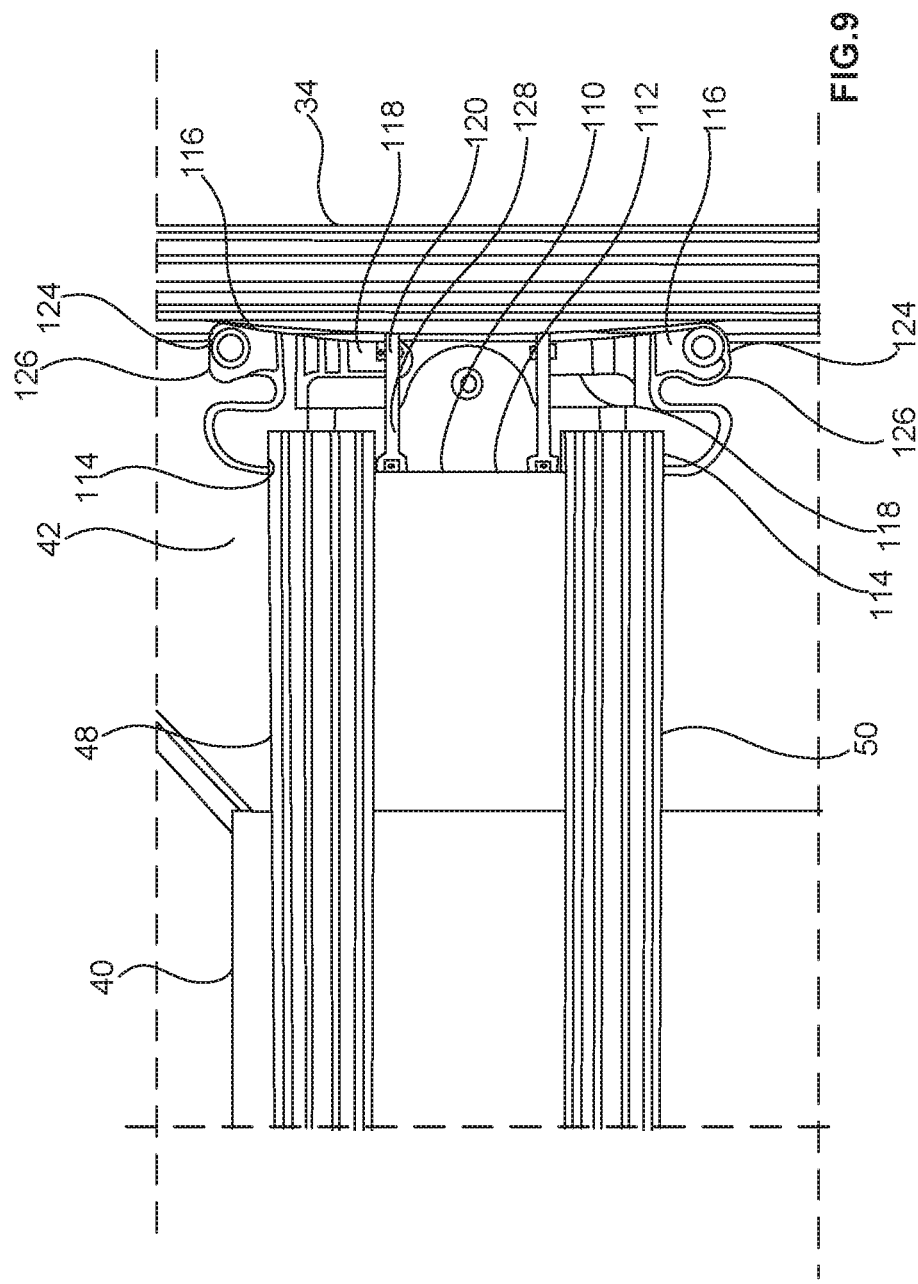
FIG. 9 illustrates an enlarged view of the first end of the extruder assembly of FIG. 2 in which an extruder assembly adjustment mechanism is disposed between the first end of the extruder assembly and the top rail for calibrating the orientation of the extruder assembly in the X-Y plane.

FIG. 9 illustrates an enlarged view of the first end 42 of the extruder assembly 40 of FIG. 2. An extruder assembly adjustment mechanism 110 (illustrated in cross-section) is disposed between the first end 42 of the extruder assembly 40 and the top rail 34 for calibrating the orientation of the extruder assembly 40 in the X-Y plane. The extruder assembly adjustment mechanism 110 generally includes a base 112 configured to be secured to an end 42,44 of the extruder assembly 40 and to carry at least one bearing wheel 124 for engaging the corresponding top rail 34. In the illustrated embodiment, the extruder assembly 40 includes first and second rails 48,50 along which the extruder 46 is translated. The base 112, accordingly, defines two receptacles 114 configured to closely receive one end 42,44 of each of the first and second rails 48,50.

Figure 10:
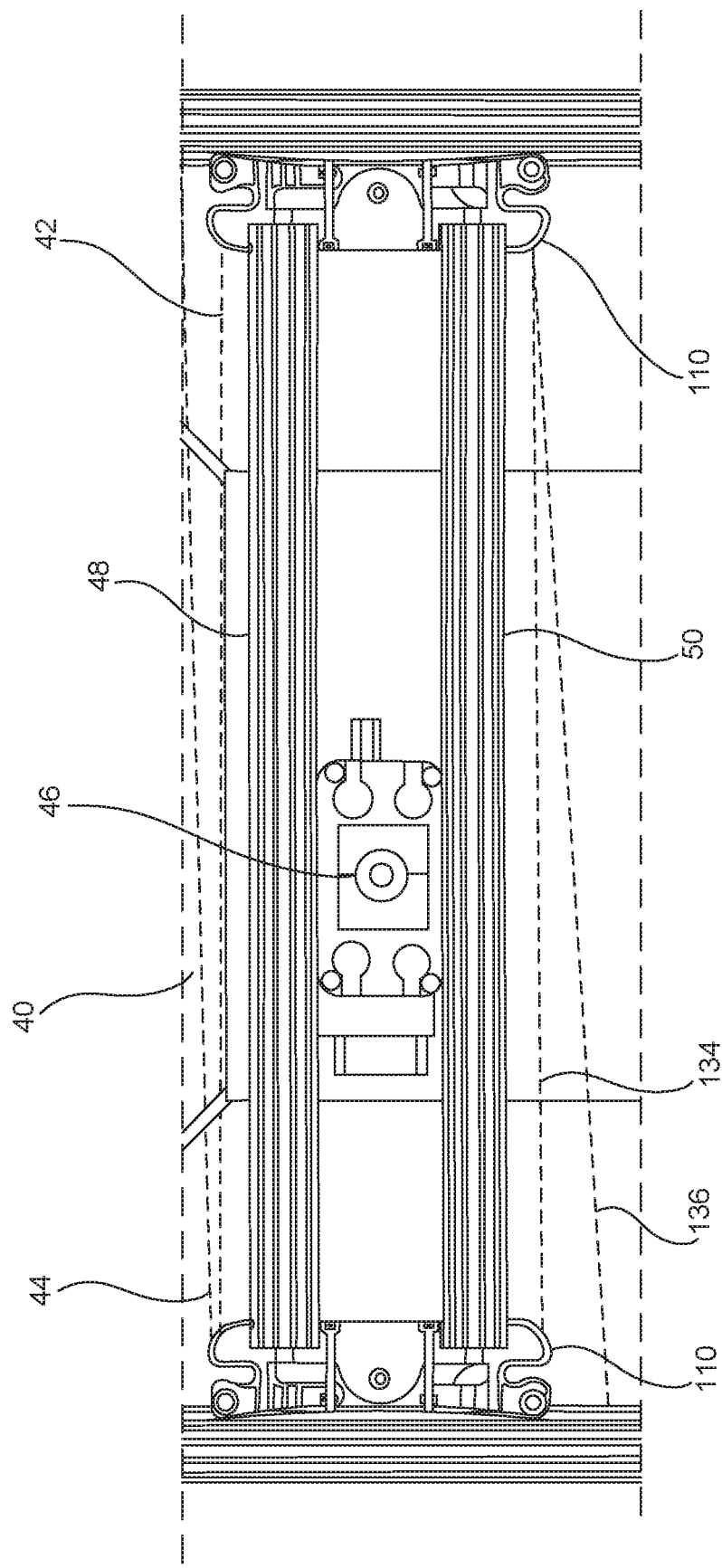
FIG. 10 illustrates the extruder assembly after it has been calibrated, and further illustrates a skewed orientation graphically represented with broken lines prior to calibration.

FIG. 10 illustrates the extruder assembly after it has been calibrated, graphically represented with broken lines 134. A skewed orientation is graphically represented with broken lines at 136, prior to calibration.

Figure 11:
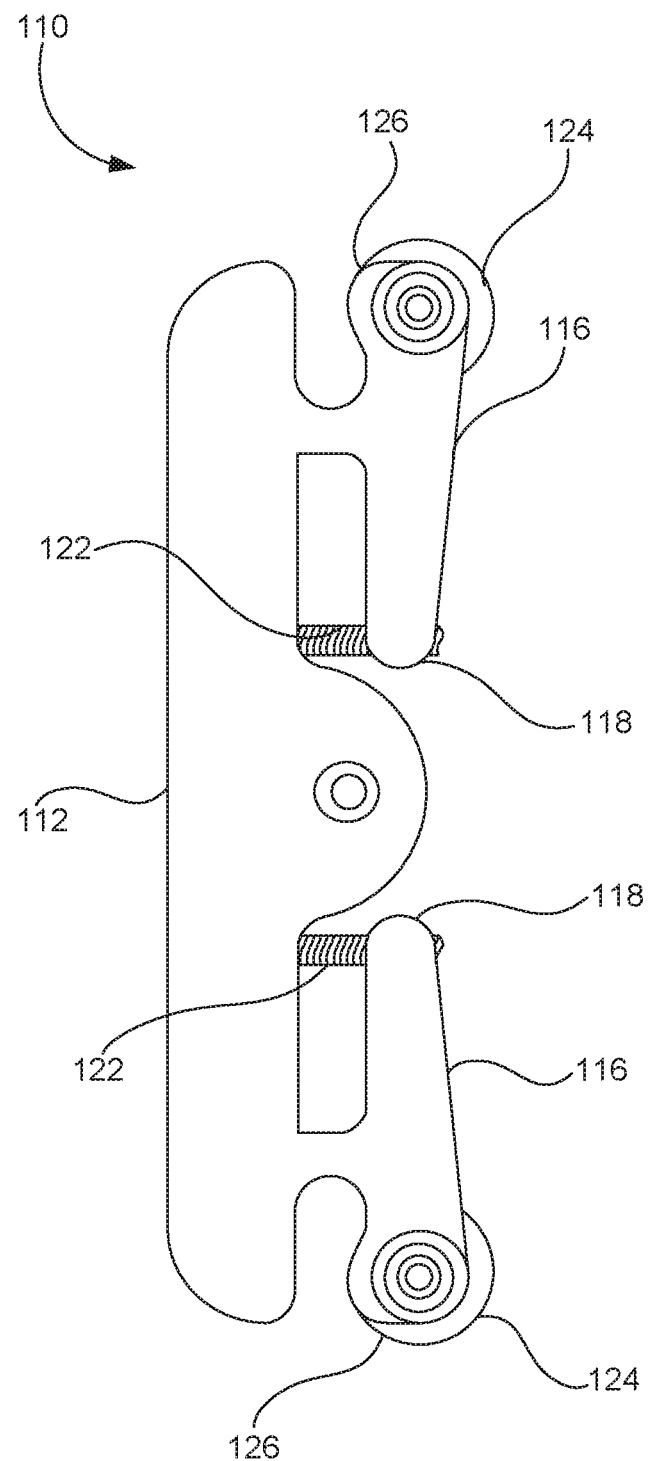
FIG. 11 illustrates one embodiment of the extruder assembly adjustment mechanism.
Figure 12:
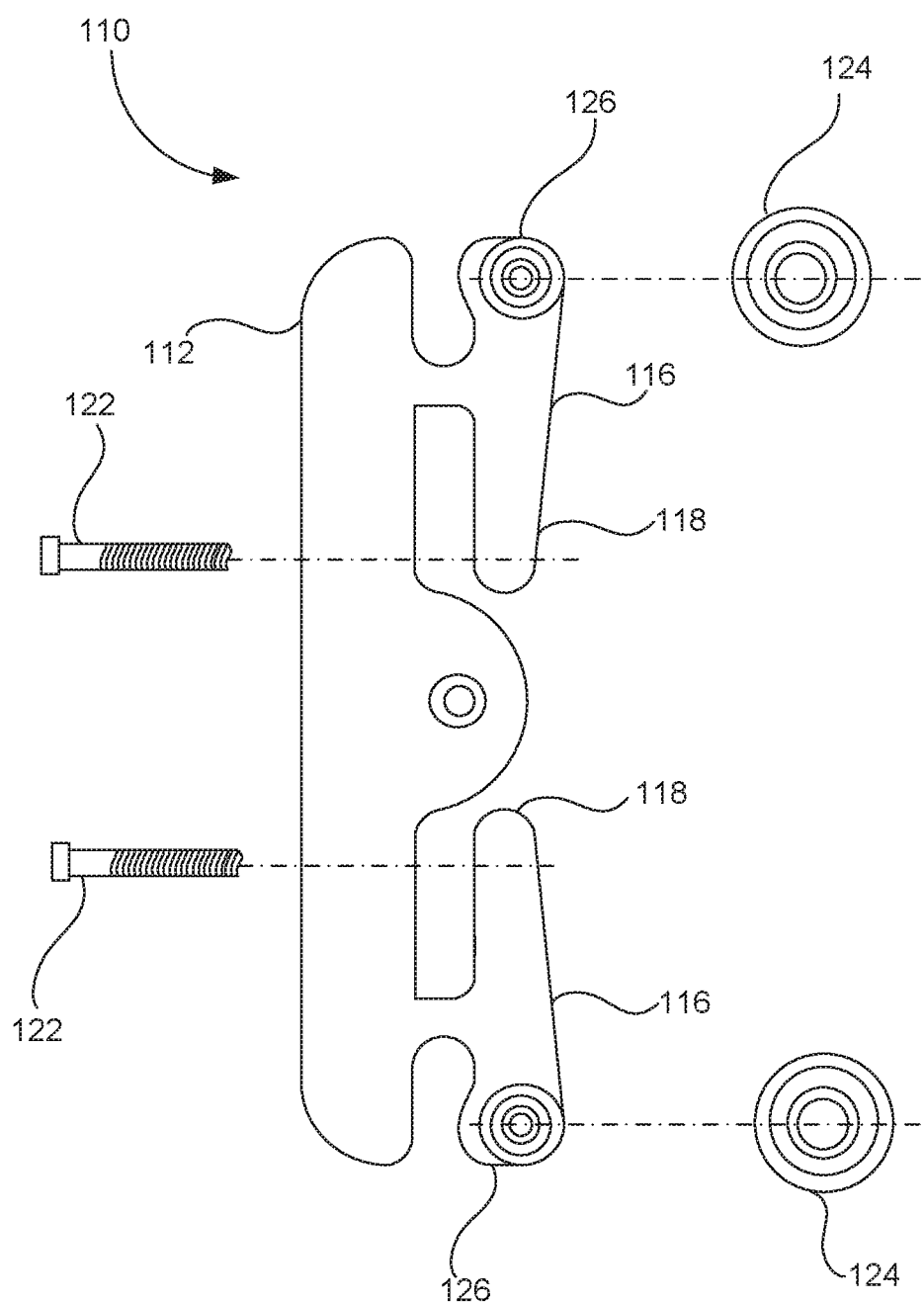
FIG. 12 illustrates an exploded view of the extruder assembly adjustment mechanism shown in FIG. 11.

FIG. 11 illustrates one embodiment of the extruder assembly adjustment mechanism 110. FIG. 12 illustrates an exploded view of the extruder assembly adjustment mechanism 110 shown in FIG. 11. The base 112 further defines two articulated arms 116, one each in cooperation with a threaded screw 122. One of the bearing wheels 124 is rotatably mounted on the distal end 126 of each articulated arm 116. A threaded member 120 is carried by an interior end 118 of each articulated arm for cooperatively engaging the threaded portion of a threaded screw 122. As each screw 122 is rotated in a first direction, the articulated arm 116 is either extended or retracted. When the screw 122 is rotated in the opposite second direction, the articulated arm 116 is either retracted or extended. In order to calibrate the orientation of the extruder assembly 40, the screws 122 are rotated in opposite directions with respect to each other until the orientation of the extruder assembly 40 is true.

FIG. 13 is an enlarged view of the corner rail 14 of the frame 12. In this illustration, two top rails 34 are secured to the first and second mounting surfaces 20,22 of the corner rail 14 in a conventional manner. Further illustrated is a bearing wheel 90 of a build platform adjustment mechanism 72 in engagement with the bearing surface 24 of the corner rail 14.

A 3D printer incorporating an adjustable carriage and optimized bearing surface is described above. Various details of the invention may be changed without departing from its scope. Furthermore, the foregoing description of the preferred embodiments of the invention and best mode for practicing the invention are provided for the purpose of illustration only and not for the purpose of limitation.

What is claimed is:

1. An apparatus for performing work in three dimensions including:
 a frame including:
  four stationary corner rails disposed vertically along a Z-axis and in a rectangular array, each of said stationary corner rails including a lower end and an upper end, said four stationary corner rails including a first corner rail, a second corner rail positioned adjacent said first corner rail, a third corner rail positioned adjacent said second corner rail, and a fourth corner rail positioned between said third corner rail and said first corner rail, wherein each of said four stationary corner rails defines at least a first frame mounting surface, a second frame mounting surface, and a rail bearing surface, said rail bearing surface being disposed between said first and second frame mounting surfaces, said first frame mounting surface being disposed orthogonally with respect to said second frame mounting surface;
  a bottom support secured proximate said lower end of each of said four stationary corner rails such that said lower end of each of said four stationary corner rails is fixed relative to said lower end of each other of said four stationary corner rails;
  an upper support secured proximate said upper end of each of said four stationary corner rails such that said upper end of each of said four stationary corner rails is fixed relative to said upper end of each other of said four stationary corner rails, said upper support including:
   a first upper rail secured between said upper end of said first and second corner rails, said first upper rail being disposed along an X-axis;
   a second upper rail secured between said upper end of said second and third corner rails, said second upper rail being disposed along a Y-axis;
   a third upper rail secured between said upper end of said third and fourth corner rails, said third upper rail being disposed along said X-axis and parallel with said first upper rail; and
   a fourth upper rail secured between said upper end of said fourth and first corner rails, said fourth upper rail being disposed along said Y-axis and parallel with said second upper rail;

wherein said X-axis and said Y-axis are orthogonally-disposed with respect to each other and with respect to said Z-axis;

wherein:

said first upper rail is secured between said first frame mounting surface of said first corner rail and said second frame mounting surface of said second corner rail;

said second upper rail is secured between said first frame mounting surface of said second corner rail and said second frame mounting surface of said third corner rail;

said third upper rail is secured between said first frame mounting surface of said third corner rail and said second frame mounting surface of said fourth corner rail; and said fourth upper rail is secured between said first frame mounting surface of said fourth corner rail and said second frame mounting surface of said first corner rail;

a working head assembly defining a first end and a second end, said first end being moveably engaged with said first upper rail and said second end being moveably engaged with said third upper rail such that said working head assembly is limited to movement along said X-axis with respect to said frame, said working head assembly extending along said Y-axis, said working head assembly including a working head moveably engaged with said working head assembly such that said working head is limited to movement along said Y-axis;

a carriage assembly defining first, second, third, and fourth corners each moveably engaged with said first, second, third, and fourth corner rails, respectively, such that said carriage assembly is limited to movement along said Z-axis, said carriage assembly defining an upper side and a lower side;

wherein:

said carriage assembly first corner is moveably engaged with said first corner rail bearing surface;

said carriage assembly second corner is moveably engaged with said second corner rail bearing surface;

said carriage assembly third corner is moveably engaged with said third corner rail bearing surface; and said carriage assembly fourth corner is moveably engaged with said fourth corner rail bearing surface; and a working surface mounted on said carriage assembly upper side.

2. The apparatus of claim 1 further including:

a first adjustment mechanism mounted on said carriage assembly first corner and between said carriage assembly first corner and said first corner rail bearing surface; and a second adjustment mechanism mounted on said carriage assembly second corner and between said carriage assembly second corner and said second corner rail bearing surface;

each of said first and said second adjustment mechanisms being provided for calibrating an orientation of said working surface to be parallel with an X-Y plane defined by said X-axis and said Y-axis.

3. The apparatus of claim 2 wherein each of said first and said second adjustment mechanisms includes:

a housing defining:
   a first end and a second end;
   an upper edge and a lower edge;
   a first threaded opening disposed between said first end and said second end and proximate said upper edge; and
   a second threaded opening disposed between said first end and said second end and proximate said lower edge;

a receptacle disposed at said first end and configured to loosely receive one of said carriage assembly first and second corners;

at least one bearing wheel rotatably carried at said housing second end, said at least one bearing wheel engaging one of said first corner rail bearing surface and said second corner rail bearing surface;

a first threaded screw disposed in threaded engagement with said first threaded opening, said first threaded screw defining a distal end being extendable into said receptacle and in engagement with one of said carriage assembly first corner and said carriage assembly second corner; and a second threaded screw disposed in threaded engagement with said second threaded opening, said second threaded screw defining a distal end being extendable into said receptacle and in engagement with said one of said carriage assembly first corner and said carriage assembly second corner;

wherein rotational adjustment of either of said first and second threaded screws changes said orientation of said working surface.

4. The apparatus of claim 3 wherein said housing further defines a first slotted opening and a second slotted opening, and wherein each of said first and said second adjustment mechanisms further includes:

a first adjustment wheel threadably engaged with said first threaded screw and extending from said first slotted opening such that as said first adjustment wheel is rotated in either direction, said distal end of said first threaded screw is moved toward and away from said one of said carriage assembly first corner and said carriage assembly second corner; and a second adjustment wheel threadably engaged with said second threaded screw and extending from said second slotted opening such that as said second adjustment wheel is rotated in either direction, said distal end of said second threaded screw is moved toward and away from said one of said carriage assembly first corner and said carriage assembly second corner.

5. The apparatus of claim 3 wherein said at least one bearing wheel includes a first bearing wheel disposed proximate said upper edge and a second bearing wheel disposed proximate said lower edge.

6. The apparatus of claim 2 further including:

a third adjustment mechanism mounted on said carriage assembly third corner and between said carriage assembly third corner and said third corner rail bearing surface; and a fourth adjustment mechanism mounted on said carriage assembly fourth corner and between said carriage assembly fourth corner and said fourth-corner rail bearing surface;

each of said third and said fourth adjustment mechanisms being provided for calibrating said orientation of said working surface to be parallel with said X-Y plane.

7. The apparatus of claim 6 wherein each of said third and said fourth adjustment mechanisms includes:

a housing defining:
   a first end and a second end;
   an upper edge and a lower edge;
   a first threaded opening disposed between said first end and said second end and proximate said upper edge; and a second threaded opening disposed between said first end and said second end and proximate said lower edge;
a receptacle disposed at said first end and configured to loosely receive one of said carriage assembly third and fourth corners;
at least one bearing wheel rotatably carried at said housing second end, said at least one bearing wheel engaging one of said third corner rail bearing surface and said fourth corner rail bearing surface;
a first threaded screw disposed in threaded engagement with said first threaded opening, said first threaded screw defining a distal end being extendable into said receptacle and in engagement with one of said carriage assembly third corner and said carriage assembly fourth corner; and
a second threaded screw disposed in threaded engagement with said second threaded opening, said second threaded screw defining a distal end being extendable into said receptacle and in engagement with said one of said carriage assembly third corner and said carriage assembly fourth corner;
wherein rotational adjustment of either of said first and second threaded screws changes said orientation of said working surface.

8. The apparatus of claim 7 wherein said housing further defines a first slotted opening and a second slotted opening, and wherein each of said first and said second adjustment mechanisms further includes:
a first adjustment wheel threadably engaged with said first threaded screw and extending from said first slotted opening such that as said first adjustment wheel is rotated in either direction, said distal end of said first threaded screw is moved toward and away from said one of said carriage assembly third corner and said carriage assembly fourth corner; and
a second adjustment wheel threadably engaged with said second threaded screw and extending from said second slotted opening such that as said second adjustment wheel is rotated in either direction, said distal end of said second threaded screw is moved toward and away from said one of said carriage assembly third corner and said carriage assembly fourth corner.

9. The apparatus of claim 7 wherein said at least one bearing wheel includes a first bearing wheel disposed proximate said upper edge and a second bearing wheel disposed proximate said lower edge.

10. The apparatus of claim 1 further including a first working head assembly adjustment mechanism for calibrating an orientation of said working head assembly with respect to said Y-axis, said first working head assembly adjustment mechanism being carried by said working head assembly first end and disposed between said working head assembly first end and said first upper rail, said first working head assembly adjustment mechanism including:
a first base secured to said working head assembly first end, said first base defining a first through opening for receiving a first threaded screw and a second through opening for receiving a second threaded screw;
first and second articulated arms each defining a proximal end, a distal end, and an approximate midpoint, each of said first and second articulated arms being pivotally attached to said first base at said approximate midpoint, said proximal end of said first articulating arm defining a threaded opening for threadably receiving a distal end of said first threaded screw, and said proximal end of said second articulating arm defining a threaded opening for threadably receiving a distal end of said second threaded screw; and
a first bearing wheel rotatably disposed at said distal end of said first articulated arm and a second bearing wheel rotatably disposed at said distal end of said second articulated arm, each of said first and second bearing wheels being disposed in engagement with said first upper rail;
whereby rotational adjustment of either of said first and second threaded screws changes said orientation of said working head assembly with respect to said Y-axis.

11. The apparatus of claim 10 further including a second working head assembly adjustment mechanism for calibrating an orientation of said working head assembly with respect to said Y-axis, said second working head assembly adjustment mechanism being carried by said working head assembly second end and disposed between said working head assembly second end and said third upper rail, said second working head assembly adjustment mechanism including:
a second base secured to said working head assembly second end, said second base defining a first through opening for receiving a first threaded screw and a second through opening for receiving a second threaded screw;
first and second articulated arms each defining a proximal end, a distal end, and an approximate midpoint, each of said first and second articulated arms being pivotally attached to said second base at said approximate midpoint, said proximal end of said first articulating arm defining a threaded opening for threadably receiving a distal end of said first threaded screw, and said proximal end of said second articulating arm defining a threaded opening for threadably receiving a distal end of said second threaded screw; and
a first bearing wheel rotatably disposed at said distal end of said first articulated arm and a second bearing wheel rotatably disposed at said distal end of said second articulated arm, each of said first and second bearing wheels being disposed in engagement with said third upper rail;
whereby rotational adjustment of either of said first and second threaded screws changes said orientation of said working head assembly with respect to said Y-axis.

12. The apparatus of claim 1 wherein said carriage assembly defines a substantially X-shaped support structure including first, second, third, and fourth arms, each defining a proximal end and a distal end, each of said first, second, third, and fourth arm proximal ends being disposed toward a center of said carriage assembly, and said first, second, third, and fourth arm distal ends defining said first, second, third, and fourth carriage assembly corners, respectively.

13. The apparatus of claim 1 further comprising a height adjustment mechanism for translating said carriage assembly and said working surface along said Z-axis, said height adjustment mechanism including:
a first threaded rod disposed parallel to said Z-axis and defining a proximal and a distal end;
a first threaded member configured to rotatably engage said first threaded rod, said first threaded member being disposed on one of said carriage assembly and said working surface; and
a motor in engagement with one of said proximal end of said first threaded rod and said distal end of said first threaded rod such that when said motor is operated, said first threaded rod is rotated in a selected direction with respect to said first threaded member thereby imparting translational movement of said carriage assembly and said working surface in a selected direction along said Z-axis.

14. The apparatus of claim 1 wherein said apparatus is a three-dimensional printer, wherein said working head is an extruder, and wherein the working surface is a build platform, said extruder being provided for depositing a selected material onto said build platform as said working head assembly is selectively moved along said X-axis, said extruder is selectively moved along said Y-axis and said build platform is selectively moved along said Z-axis to form a selected three-dimensional object.

\* \* \* \* \*